June 16, 1936.                O. K. KJOLSETH                2,044,576
                          LATERAL RESTRAINT DEVICE
                           Filed March 30, 1935
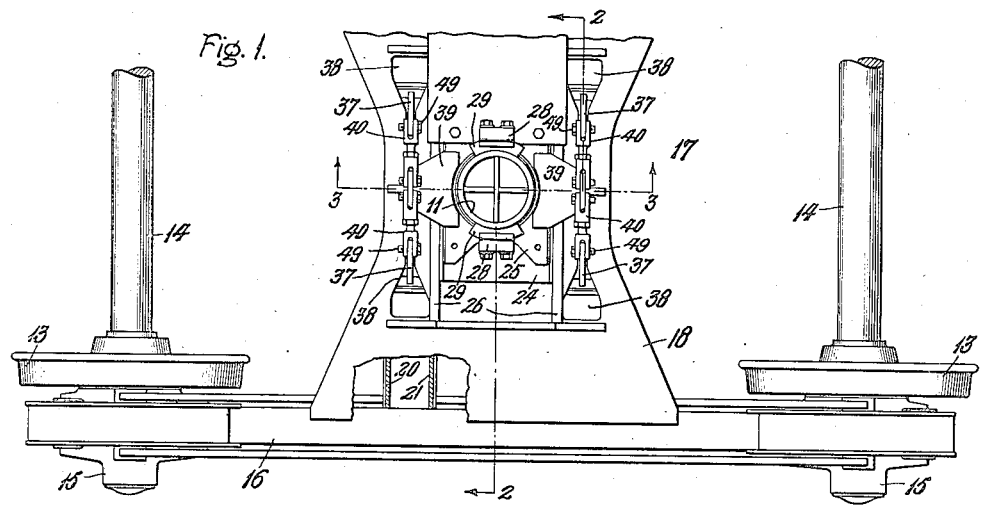
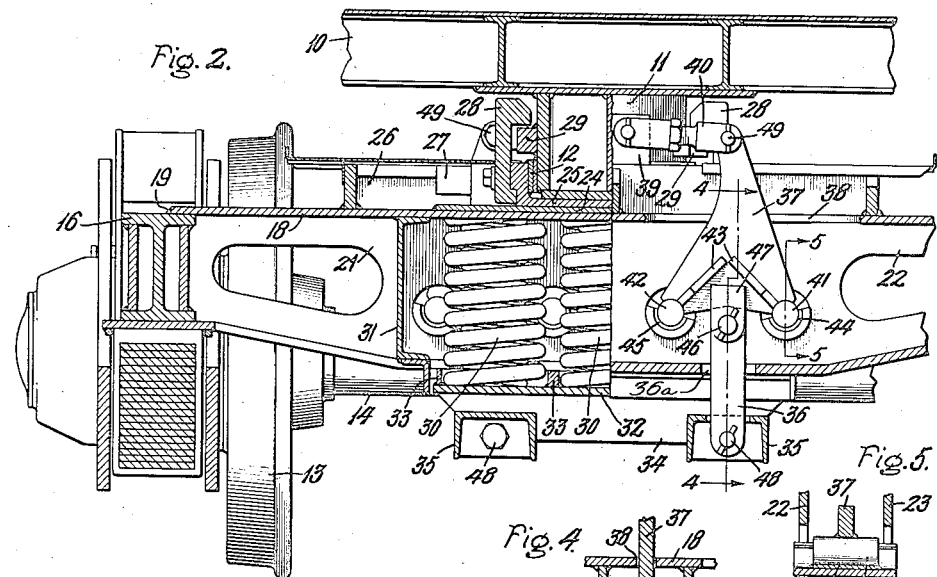
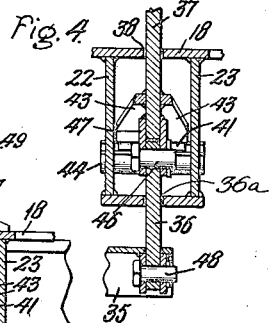
Inventor:
Ole K. Kjolseth,
by Harry E. Dunham
His Attorney.

Patented June 16, 1936

2,044,576

UNITED STATES PATENT OFFICE 2,044,576

LATERAL RESTRAINT DEVICE

Ole K. Kjolseth, Erie, Pa., assignor to General Electric Company, a corporation of New York Application March 30, 1935, Serial No. 13,903

9 Claims. (Cl. 105—189)

My invention relates to a lateral restraint device for controlling the movement of a guiding truck relative to the underframe of a locomotive or car.

In constructing locomotives or cars, pivoted guiding trucks are usually provided to resist swaying or nosing of the locomotive at high speeds and also to facilitate traversing a curve in the track by exerting a turning moment on the front end of the locomotive or car. Ordinarily these guiding trucks are spaced apart longitudinally of the frame and arranged beyond the ends of the main trucks of the locomotive or car, and it is, therefore, necessary that the trucks be attached to the frame in such a manner that they can move laterally with respect thereto upon rounding a curve in the track. During operation of a locomotive or car of this type unevenness in the track tends to set up oscillations of the guiding trucks relative to the underframe, and to overcome this effect, restraining devices have been employed for centering the trucks laterally with respect to the frame.

It is an object of my invention to provide an improved lateral restraint device for trucks of simple and compact construction.

Another object of my invention is to provide a lateral restraint device arranged to utilize a truck bolster as a housing for the resilient parts of the device.

Further objects and advantages of my invention will become apparent as the following description proceeds, and the features of novelty which characterize my invention will be pointed out with particularity in the claims appended to and forming a part of this specification.

In the drawing Fig. 1 is a plan view of a portion of a guiding truck embodying my invention; Fig. 2 is a sectional view on line 2—2 of Fig. 1 showing in elevation the details of the spring plank and rocker arrangement; Fig. 3 is a transverse sectional view on line 3—3 of Fig. 1; Fig. 4 is a detailed sectional view on line 4—4 of Fig. 2 illustrating the linkage connecting the spring plank with one of the rockers; and Fig. 5 is a detailed sectional view of the rocker supports, on line 5—5 of Fig. 2.

Referring to the drawing, the locomotive or car, in connection with which I have shown my invention, comprises a platform structure 10 having a center pin 11 attached thereto engaging a center pin bearing 12 on the truck which is adapted to pivotally support the platform structure 10. The truck comprises wheels 13 and axles 14 having journal boxes 15 arranged in side frames 16, which are connected together by a bolster indicated generally at 17.

Although certain aspects of my invention are applicable to any type of lateral motion truck, the preferred embodiment, selected for the purposes of illustration, is a truck of the fabricated welded type. In the construction illustrated, the bolster 17 comprises a bolster plate 18 welded to side frames 16 at 19 and supported by spaced crossbeams 20, 21, 22, and 23 as shown in Figs. 1 and 3, which are secured to the adjacent parts of the truck by welding. The platform structure 10 is pivotally supported on the truck in such manner that it can move laterally with respect thereto toward either side of the center, as may be required when the locomotive or car traverses a curve. This is accomplished by providing a bearing plate 24 welded to the bolster plate 18 supporting a slidable centerplate 25. The necessary relative turning movement between the car frame and the truck is provided by the cylindrical bearing 12 engaging the center pin 11. The centerplate 25 slidably engages at 25a a guideway comprising transverse members 26 and bearing member 27 to provide for the relative lateral movement of the car frame and the bolster. Segmental stop members 28 and 29 are fastened, respectively, to the centerplate 25 and the center pin 11 in order to retain the center pin in the cylindrical seat 12.

In accordance with my invention, the improved lateral restraint device illustrated comprises a plurality of nested coil springs 30 which are arranged to bear against the underside of the bolster plate 18 directly beneath the central position of the slidable centerplate 25. Channels 31 are arranged below the bolster plate 18 and extend between crossbeams 21 and 22 to form therewith a spring housing open at the bottom, the channels 31 being welded to the bolster plate 18 and to the crossbeams 21 and 22. The coil springs 30 are retained under compression in the spring housing by a spring plank 32 having seats formed by bars 33, welded to the upper surface of the spring plank 32. Transverse reinforcing beams 34 are welded to the bottom of the spring plank and to the supporting channels 35. The channels 35 are suspended by four hangers 36 from a plurality of corresponding rockers 37. The rockers extend through openings 38 in the bolster plate 18, and are supported on crossbeams 20, 21, 22, and 23. The upper end of each rocker 37 is connected to a horizontally extending portion 39 of the slidable centerplate 25 by adjustable links 40. Inasmuch as the detail construction of each rocker is identical, it will be described only by reference to a single rocker, the details of which are shown best in Figs. 4 and 5. The body portion of the rocker 37 comprises a substantially triangular-shaped plate having transverse bearing pins 41 and 42 welded to the lower corners thereof and reinforced by gusset plates 43 welded to the rocker 37 and to the pins 41 and 42. These pins are supported, respectively, on a pair of semi-cylindrical bearings 44 and 45 mounted in openings in the crossbeams 22 and 23 and welded thereto.

A flexible assembly is obtained by connecting the spring plank 32 to the lower portion of the rockers 37 by four hangers 36 extending through opening 36a. The upper ends of the hangers 36 are connected to the rockers by pins 46 extending through lugs 47, welded to the middle of the lower portion of the rocker. The lower ends of the hangers 36 are pivotally connected at 48 to the supporting channels 35 of the spring plank 32 and the adjustable links 49 are pivotally connected to the upper ends of rockers by pins 49.

The operation of the above described restraint device will be clear from a consideration of its action when the locomotive or car enters a curve. Under this condition, there will be a tendency for the platform structure 10 to move either to the right or left relative to the guiding truck, as viewed in Fig. 2. Assuming the motion of the car frame to be to the right, the slidable centerplate 25 will shift to the right and the linkage connections 40 will cause the rockers 37 to pivot about pins 41 lifting pins 42 from their bearing surfaces 45. This tilting of the four rockers 37 will tend to lift the spring plank 32 against the force exerted by coil springs 30, and the lateral motion of the center plate 25 and truck 10 will thereby be resisted by the springs. If the movement is in the opposite direction, the rockers will pivot about the other pins and the same action of the spring plank 32 will again restrain the lateral motion.

It is apparent that I have provided a simple and very compactly arranged lateral restraint device, wherein the truck bolster is utilized as a housing for which a spring plank forms a floating closure excluding dust and dirt from the restraint springs.

Although I have described a particular embodiment of my invention, modifications thereof will occur to those skilled in the art, so that I do not desire my invention to be limited to the construction shown and described, and I intend in the appended claims to cover all modifications within the spirit and scope of my invention.

What I claim as new and desire to secure by Letters Patent of the United States is:

1. A locomotive or car having a frame and a truck, means for supporting said frame on said truck, said supporting means being movable laterally of said truck, a spring plank arranged below said supporting means, a spring arranged to engage said spring plank and the portion of said truck below said supporting means, a rocker supported on said truck and connected to said car frame and said spring plank, and means utilizing said rocker for resiliently centering said frame with respect to said truck.

2. A locomotive or car having a frame and a truck, means including a bearing member movable laterally on said truck for supporting said frame on said truck, a rocker supported on said truck and connected to said bearing member, a spring plank arranged below said bearing member, means for connecting said spring plank to said rocker, and means including springs retained between said spring plank and the portion of said truck below said bearing member for resiliently centering said bearing member on said truck.

3. A locomotive or car having a frame and a truck, means for supporting said frame on said truck, said supporting means being movable laterally of said truck, a vertically extending compression spring arranged to engage the portion of said truck below said supporting means, means including a spring plank arranged below said supporting means and a rocker supported on said truck for retaining said spring under compression, and means utilizing said rocker and spring for resiliently centering said frame with respect to said truck.

4. A lateral restraint device for a locomotive or car having a frame and a truck, means including a centerplate for supporting said frame on said truck, a guide slidably engaging said centerplate and extending transversely of said truck, rockers supported on said truck and connected to said centerplate, a spring plank, means for suspending said spring plank from said rockers below said centerplate, and means including a spring engaging said spring plank and the portion of said truck below said center plate for resiliently centering said centerplate on said truck.

5. In combination with a locomotive or car having a frame and a truck, a bolster for said truck, means including a bearing member laterally movable on said bolster for supporting said frame on said truck, a spring, a housing for said spring secured to said bolster and having an open side, means including a spring plank movable through said open side for forming a floating closure for said housing, said spring plank being arranged to engage said spring, rockers connected to said spring plank and to said bearing member, and means utilizing said spring and said rockers for resiliently centering said bearing member on said bolster.

6. A lateral restraint device for a locomotive or car having a frame and a truck, said truck including longitudinal side frames and a bolster extending therebetween, means laterally movable with respect to said bolster and mounted thereon for supporting said frame on said truck, a spring arranged to engage the underside of said bolster below said supporting means, means including a spring plank and a rocker supported in said bolster for retaining said spring under compression, and means utilizing said rocker and said spring for resiliently centering said frame supporting means with respect to said bolster.

7. A locomotive or car having a frame and a truck, said truck including longitudinal side frames and a bolster extending therebetween, means including a centerplate for supporting said frame on said bolster, a guide slidably engaging said centerplate and extending transversely of said bolster, a spring arranged to engage the underside of said bolster below said centerplate, a rocker connected to said centerplate and supported on said bolster, means including said rocker and a spring plank for retaining said spring under compression, and means utilizing said spring and said rocker for resiliently centering said centerplate on said bolster.

8. A lateral restraint device for a locomotive or car having a frame and a truck, a bolster for said truck, means including a centerplate for supporting said frame on said bolster, a guide slidably engaging said centerplate and extending transversely of said bolster, a spring, a housing for said spring secured to said bolster and having an open side, means including a spring plank movable through the open side of said housing for providing a floating closure for said housing, rockers connected to said spring plank and to said centerplate, and means utilizing said spring and said rockers for resiliently centering said centerplate with respect to said bolster.

9. A lateral restraint device for a locomotive or car having a frame and a truck, a bolster plate for said truck, means including a bearing member movable laterally on said bolster plate for supporting said frame on said truck, spaced crossbeams secured to said bolster plate, means including laterally spaced walls secured to said crossbeams and to said bolster plate for forming therewith an open bottom housing, a spring in said housing arranged to engage said bolster plate, means including a spring plank arranged in the open bottom of said housing for providing a floating closure for said housing, rockers connected to said spring plank and to said bearing member, and means utilizing said spring and said rockers for resiliently centering said bearing member on said bolster plate.

OLE K. KJOLSETH.